No. 612,421. Patented Oct. 18, 1898.
O. H. & W. M. JEWELL.
FILTER.
(Application filed Apr. 2, 1898.)
(No Model.)
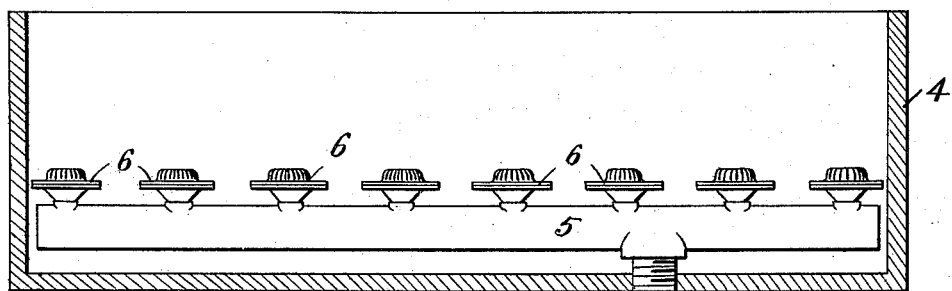
Fig. 1.
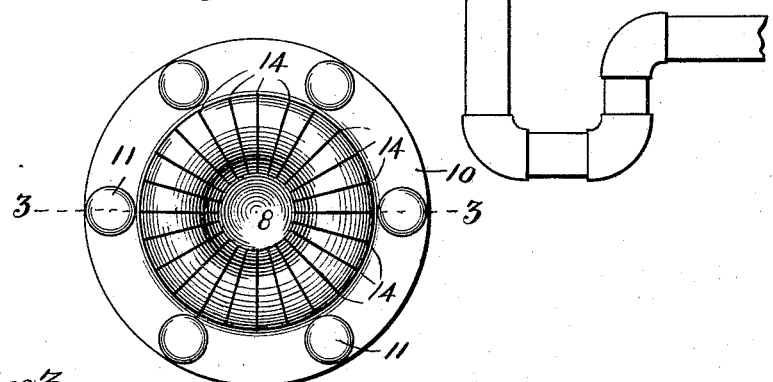
Fig. 2.
Fig. 3.
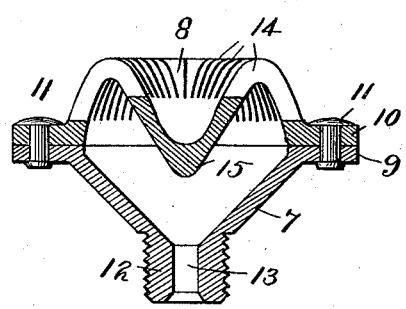
Witnesses.
Inventors.
Omar H. Jewell,
William M. Jewell,
By Bond Adams Pickard Jackson
Atty's.
THE NORRIS PETERS CO., PHOTO-LITHO., WASHINGTON, D. C.

UNITED STATES PATENT OFFICE.

OMAR H. JEWELL AND WILLIAM M. JEWELL, OF CHICAGO, ILLINOIS, ASSIGNORS TO THE O. H. JEWELL FILTER COMPANY, OF SAME PLACE.

FILTER.

SPECIFICATION forming part of Letters Patent No. 612,421, dated October 18, 1898.

Application filed April 2, 1898. Serial No. 676,248. (No model.)

*To all whom it may concern:*

Be it known that we, OMAR H. JEWELL and WILLIAM M. JEWELL, citizens of the United States, residing in Chicago, in the county of Cook and State of Illinois, have invented certain new and useful Improvements in Filters, of which the following is a specification.

Our invention relates to filters, and particularly to filters employing a granular filter-bed wherein strainers are used not only to prevent the particles of the granular substance composing the filter-bed from entering the pure-water-outlet pipe, but also to discharge wash-water into the filter-bed when the flow of the water is reversed for washing purposes.

In the accompanying drawings, Figure 1 is a vertical section of a part of the filter-tank. Fig. 2 is a plan view of one of the strainers, and Fig. 3 is a vertical section on line 3 3 of Fig. 2.

In granular filters as heretofore constructed the filter-bed rests upon a series of strainers which communicate with a manifold pipe through which in filtering the pure water is conducted to a pure-water-outlet pipe, and in washing the bed the current of water is reversed, flowing into the filter through the pure-water-outlet pipe, manifold, and strainers, and rising through the filter-bed, being discharged by overflowing or in some other convenient way. In filters of this class it is of great importance that the granular bed be thoroughly agitated in washing, as the impurities in time permeate the entire body of filtering material and if not removed by washing pass into the pure-water pipe. Furthermore, the impurities act to clog the filter-bed, retarding filtration and reducing the capacity of the filter. To provide for the thorough agitation of the bed in washing, it has frequently been found necessary heretofore to provide agitators, which penetrate the bed and stir up the granular material. In other cases the agitators have been dispensed with, the force of the wash-water being relied upon to agitate the filter-bed; but the latter course has been unsatisfactory, owing largely to the fact that the strainers through which the wash-water is discharged into the filter-bed have been so constructed that the wash-water is discharged in an upward direction only, thereby permitting a considerable portion of the bed between the different strainers to remain practically undisturbed, and consequently impure.

A further objection to the use of the wash-water alone for agitating the bed in constructions heretofore employed is that as the wash-water is more or less charged with particles of sand and other similar impurities when it has been discharged under the requisite pressure into the filter-bed in washing the impact of the small particles suspended in the water upon the strainers employed has been sufficient to cause them to wear away very rapidly, frequently making it necessary to provide new strainers at short intervals.

By our improvements, as will appear from the following description, we avoid the objections above pointed out and provide a construction whereby the entire filter-bed may be thoroughly agitated by the wash-water without the use of agitators. We also provide a strainer of such construction that it is not damaged substantially by the wash-water.

Referring to the accompanying drawings, 4 indicates a filter-tank.

5 indicates a manifold or other pipe or pipes with which the strainers communicate.

6 indicates a series of strainers communicating with the pipe 5.

7 indicates the pure-water-outlet pipe, which communicates with the pipe or pipes 5.

The tank 4 may be circular, square, or of any other desired shape, and the pipe or pipes 5 are so arranged that the strainers carried by said pipe or pipes are distributed over the entire bottom of the tank and are spaced short distances apart.

The construction of the strainers 6 is best shown in Figs. 2 and 3, from an inspection of which it will be seen that each strainer is composed of a base 7 and a head 8, the base having a peripheral flange 9 and the head a similar flange 10, which flanges are adapted to fit together and are secured in close contact by rivets 11 or other suitable devices, thus making the strainers substantially a single part or piece. These parts may be made integral, if desired. The base 7 is provided with a screw-threaded boss 12, having a passage 13 for the discharge and admission of water, the boss 12 serving as a means of screwing the strainer to the pipe. The passages 13 are made of such area in cross-section that the combined area of all the strainers in the filter-tank is equal to the area in cross-section of the pure-water pipe 7, by which arrangement the wash-water is equally distributed to the different strainers in washing, so that all parts of the filter-bed are washed equally, and in filtering the suction caused by the column of water in the pure-water pipe 7 is also applied equally to the different strainers, thereby effecting a uniform flow of water through the different strainers and utilizing all portions of the filter-bed substantially equally.

As illustrated in Fig. 3, the head 8 of the strainer is substantially M-shaped in vertical section, it being provided with a depressed center. The admission and discharge of water is effected through a number of slits 14 in the convex part of the head, said slits being radially arranged and extending from points near the center of the head to the flange 10, the general outline of each slit being ⋂-shaped, as is shown in Fig. 3. By this construction of the head the water is discharged not only in a vertical direction through the strainer, but is also directed laterally through the inclined portions of the slits. The imperforate center 15 of the head, which is conical in shape, serves to deflect the wash-water and direct it to the slitted portion of the head and also to receive the impact of the impurities contained in the wash-water. As illustrated in Fig. 3, the deflector is thickened at the point immediately above the passage 13, so that at the point where the greatest impact is delivered it is best fitted to receive it.

By the construction above described not only is the operation of washing greatly improved by reason of the fact that the wash-water is distributed in all directions, and consequently agitates the granular matter lying between the different strainers, but also in filtering the filtered water can gain access to the strainer from the sides as well as from above, and consequently the outflow is facilitated. The construction described also permits of making the slits longer without increasing the size of the strainers, thereby making it practicable to use finer slits than would otherwise be possible.

Instead of using continuous slits, as described, similarly-arranged perforations may be used. Furthermore, by providing lateral or inclined perforations for the passage of the water such perforations are relieved from the weight of the filter-bed, so that the water can more readily pass through them, and the sand composing the bed is not forced into the perforations, as is the case where the weight of the bed rests directly upon perforations arranged in a substantially flat surface.

That which we claim as new, and desire to secure by Letters Patent, is—

1. In a filter, the combination with a water-pipe, of a series of strainers communicating therewith, each of said strainers consisting of a perforated head, and a supporting-base having a passage for the inflow and outflow, of water, the combined area of said passages, in cross-section, being substantially equal to the cross-sectional area of the water-pipe, substantially as described.

2. In a filter, the combination with a water-pipe, of a series of strainers communicating therewith, each of said strainers consisting of a perforated head, and a supporting-base having a passage 13 for the inflow and outflow of water, the combined area of said passages 13, in cross-section, being substantially equal to the cross-sectional area of the water-pipe, substantially as described.

3. A strainer for filters, consisting of a base, having an inlet, and a head secured thereupon, said head having a plurality of radial slits, substantially as described.

4. A strainer for filters, consisting of a base, having an inlet, and a head secured thereupon, said head having a plurality of radial slits, and a deflector over the inlet, substantially as described.

5. A strainer for filters, consisting of a base, having an inlet, and a head secured thereupon, said head having a plurality of slits arranged in circular form, and a thickened conical imperforate center-piece, substantially as described.

6. A strainer for filters, consisting of a base, having an inlet, and a perforated head thereupon, said head being substantially M-shaped in cross-section, substantially as described.

7. The combination with a filter-tank, of a water-pipe, and a series of strainers communicating with said pipe, each of said strainers consisting of a base, having an inlet, and a head secured thereupon, said head having a plurality of radial slits, substantially as described.

8. The combination with a filter-tank, of a water-pipe, and a series of strainers communicating with said pipe, each of said strainers consisting of a base, having an inlet, and a head secured thereupon, said head having a plurality of curved radial slits, substantially as described.

OMAR H. JEWELL.
WILLIAM M. JEWELL.

Witnesses:
JOHN L. JACKSON,
ALBERT H. ADAMS.